(12) United States Patent
Shen

(10) Patent No.: US 8,261,411 B2
(45) Date of Patent: Sep. 11, 2012

(54) HINGE

(75) Inventor: Wen-Bin Shen, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 470 days.

(21) Appl. No.: 12/580,265

(22) Filed: Oct. 16, 2009

(65) Prior Publication Data

US 2011/0041289 A1 Feb. 24, 2011

(30) Foreign Application Priority Data

Aug. 18, 2009 (CN) ...................... 2009 2 0308235 U

(51) Int. Cl.
*E05C 17/64* (2006.01)

(52) U.S. Cl. .................. 16/340; 16/330; 16/342

(58) Field of Classification Search .............. 16/342, 16/330, 303, 340, 386, 387, 297, 374; 379/433.13; 455/575.3; 361/679.27
See application file for complete search history.

(56) References Cited

U.S. PATENT DOCUMENTS

| | | | | |
|---|---|---|---|---|
| 5,208,944 A * | 5/1993 | Lu | ................................... | 16/278 |
| 6,286,187 B1 * | 9/2001 | Chang | .............................. | 16/340 |
| 6,757,940 B2 * | 7/2004 | Lu et al. | ........................... | 16/330 |
| 7,509,709 B2 * | 3/2009 | Chung | ............................. | 16/330 |
| 7,536,749 B2 * | 5/2009 | Lu et al. | ........................... | 16/330 |
| 7,936,559 B2 * | 5/2011 | Chen | ........................ | 361/679.27 |
| 2007/0199179 A1 * | 8/2007 | Wang | .............................. | 16/340 |
| 2009/0271948 A1 * | 11/2009 | Wang | .............................. | 16/340 |
| 2011/0016669 A1 * | 1/2011 | Shen | ............................... | 16/342 |
| 2011/0232035 A1 * | 9/2011 | Huang et al. | ..................... | 16/303 |

* cited by examiner

*Primary Examiner* — William L. Miller
(74) *Attorney, Agent, or Firm* — Altis Law Group, Inc.

(57) ABSTRACT

A hinge comprises a shaft, a bracket, a first interference member, a second interference member, and a sleeve member set around and in tight contact with the shaft. A first end of the sleeve member is fixed to the bracket, and a second end of the sleeve member is fixed to the second interference member. The shaft rotates in the sleeve member to rub against the inner surface of the sleeve member to supply friction.

19 Claims, 3 Drawing Sheets

HINGE

BACKGROUND

1. Technical Field

The disclosure relates to a hinge.

2. Description of Related Art

A collapsible device, such as a notebook computer, or a clamshell mobile phone, generally including a main body and a cover, often uses a hinge to interconnect the main body and the cover. The hinge allows the cover to be rotatable with respect to the main body, and to close with the main body for saving space.

A hinge normally includes a first element and a second element fixed to the main body and the cover of the collapsible device, respectively. The first and second elements are rotatable relative to and in friction engagement with each other for maintaining the cover at any angle with respect to the main body. During rotation, the cover can maintain any angle with respect to the main body by friction of the hinge. The hinge usually includes an interference assembly for automatically and completely closing the first and second elements, and a resilient assembly causing friction between every two adjacent elements of the hinge to make the elements resist each other. The quantity of the resilient assembly is usually added to increase friction when the hinge rotates, thereby positioning one part of the collapsible device with respect to the other part of the collapsible device at desired angles. However, the added resilient assembly will supply more force to press the interference assembly, thereby affecting durability of the interference assembly.

DETAILED DESCRIPTION

Figure 1:
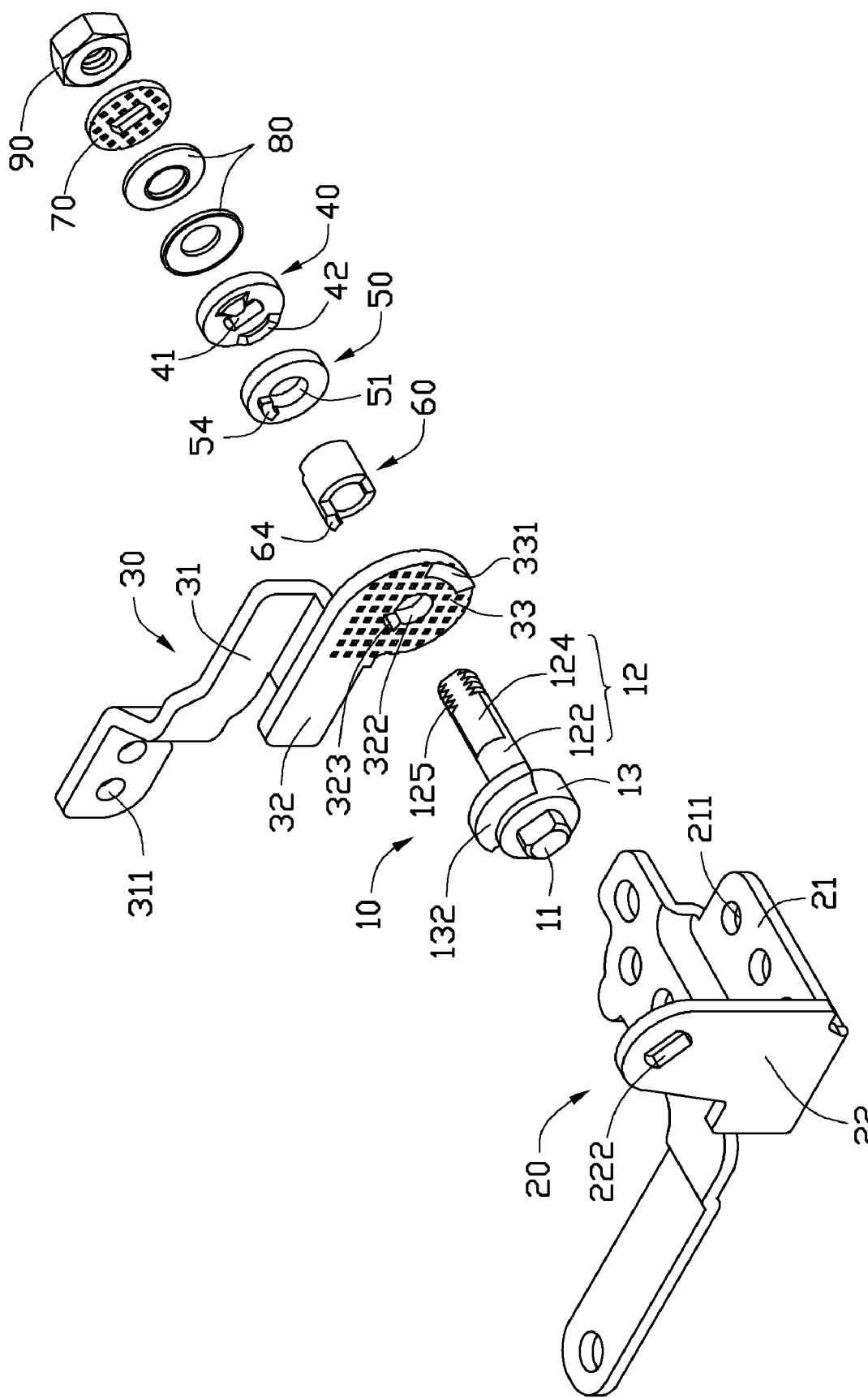
FIG. 1 is an exploded, isometric view of an exemplary embodiment of a hinge.
Figure 2:
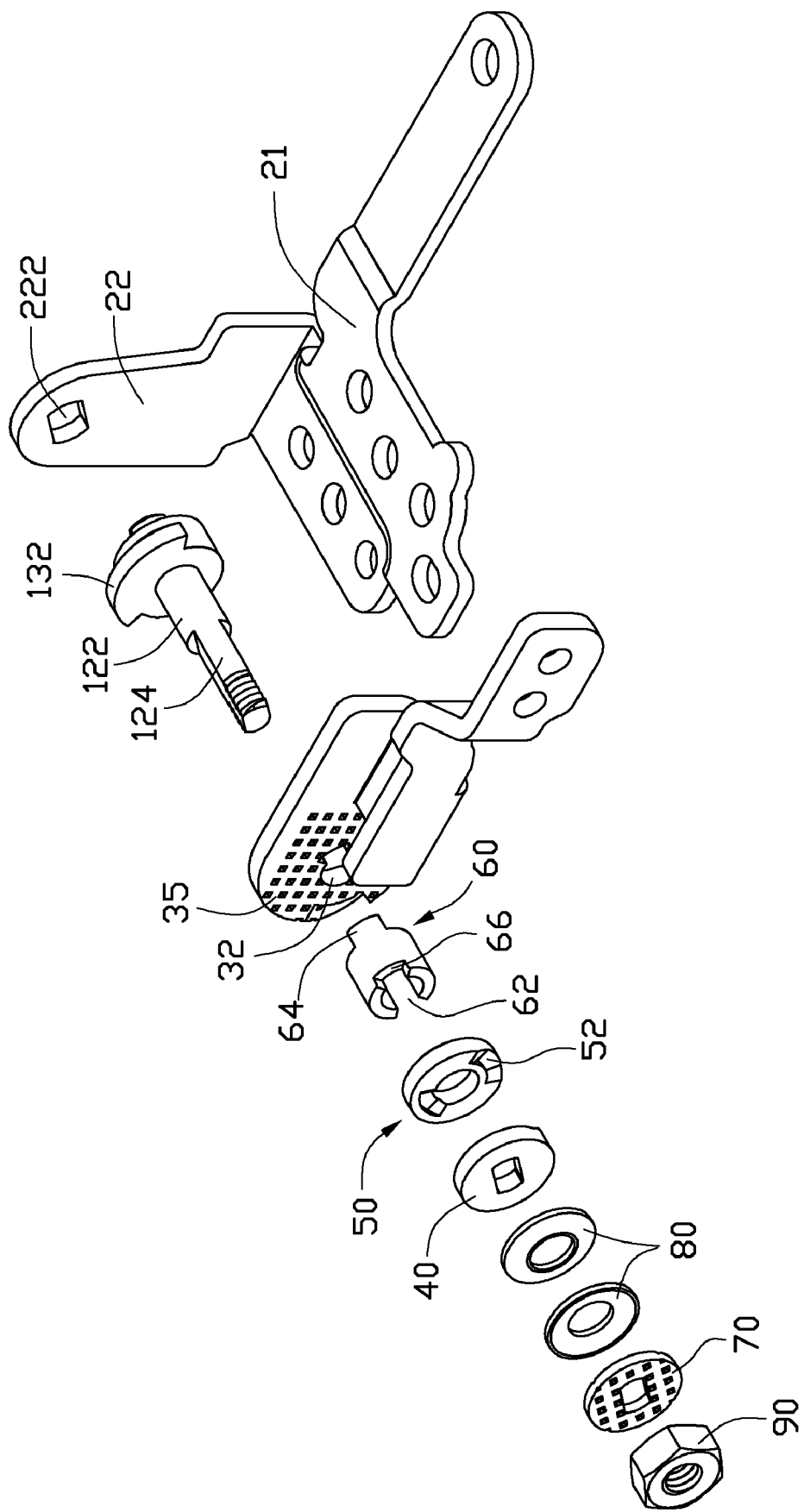
FIG. 2 is similar to FIG. 1, but viewed from another perspective.

Referring to FIGS. 1 and 2, an exemplary embodiment of a hinge mounted to a collapsible device (not shown), such as a notebook computer or a clamshell mobile phone, which includes two parts rotatably connected to each other via the hinge. The hinge includes a shaft 10, a rack 20, a bracket 30, an interference assembly, a sleeve member 60, a friction piece 70, a resilient assembly 80, and a fastener 90. The interference assembly includes a first interference member 40, and a second interference member 50 engagable with and rotatable relative to the first interference member 40.

The shaft 10 includes a head portion 13, a post 12 and a fixed portion 11 extending from opposite sides of the head portion 13. The fixed portion 11 has a double-D shaped cross-section, for fixing the shaft 10 to the rack 20. The post 12 includes a column portion 122 adjacent to the head portion 13, and a compressed portion 124 extending from the column portion 122 and away from the head portion 13. The compressed portion 124 has a noncircular, such as double-D shaped, cross section. A free end of the compressed portion 124 forms a threaded portion 125. A stopping portion 132 extends from a circumference of the head portion 13.

The rack 20 includes a mounting piece 21 and a connecting piece 22 perpendicular to the mounting piece 21. The mounting piece 21 defines a plurality of mounting holes 211 for mounting the rack 20 to one part of the collapsible device. The connecting piece 22 defines a double-D shaped mounting hole 222 for mounting the fixed portion 11 of the shaft 10.

The bracket 30 includes a mounting portion 31 and a pivot portion 32. The mounting portion 31 defines a plurality of mounting holes 311 to fix the bracket 30 to the other part of the collapsible device. The pivot portion 32 defines a pivot hole 322 extending through a first side 33 and a second side 35 opposite to the first side 33 of the pivot portion 32, for rotatable setting around the post 12 of the shaft 10. A locking slot 323 is defined in the pivot portion 32, in communication with the pivot hole 322. A block 331 extends from the first side 33 of the pivot portion 32, with one end of the block 331 smoothly transitioning to the first side 33.

The first interference member 40 is generally cylindrical, defining a double-D shape through hole 41, to snugly fit about the post 12. Two raised portions 42 protrude from one side of the first interference member 40, opposite to each other relative to the through hole 41.

The second interference member 50 is generally cylindrical, and includes a first surface opposite to the first interference member 40 and a second surface facing the first interference member 40. The second interference member 50 defines a round through hole 51 through the first and second surfaces, for rotatably receiving the post 12. An inserting pillar 54 is formed on the first surface. Two recessed portions 52 are defined in the second surface, opposite to each other relative to the through hole 51.

The sleeve member 60 is generally C-shaped. An opening 62 is defined in a circumference of the sleeve member 60, along an axis. An engaging portion 64 extends from a first end of the circumference of the sleeve member 60. A cutout 66 is defined in a second end opposite to the first end of the circumference of the sleeve member 60.

The friction piece 70 defines a double-D shaped through hole for receiving the post 12. The friction piece 70 also defines a plurality of receiving holes (not labeled) in opposite sides of the friction piece 70, for retaining lubricant therein.

The resilient assembly 80 includes two resilient pieces, each of which defines a round through hole (not labeled) for rotatably receiving the post 12. These resilient pieces are stacked together on the post 12. In an alternative embodiment, the resilient assembly 80 can include springs or other types of resilient components.

In the embodiment, the fastener 90 is a nut, and can be screwed onto the threaded portion 125 of the post 12.

Figure 3:
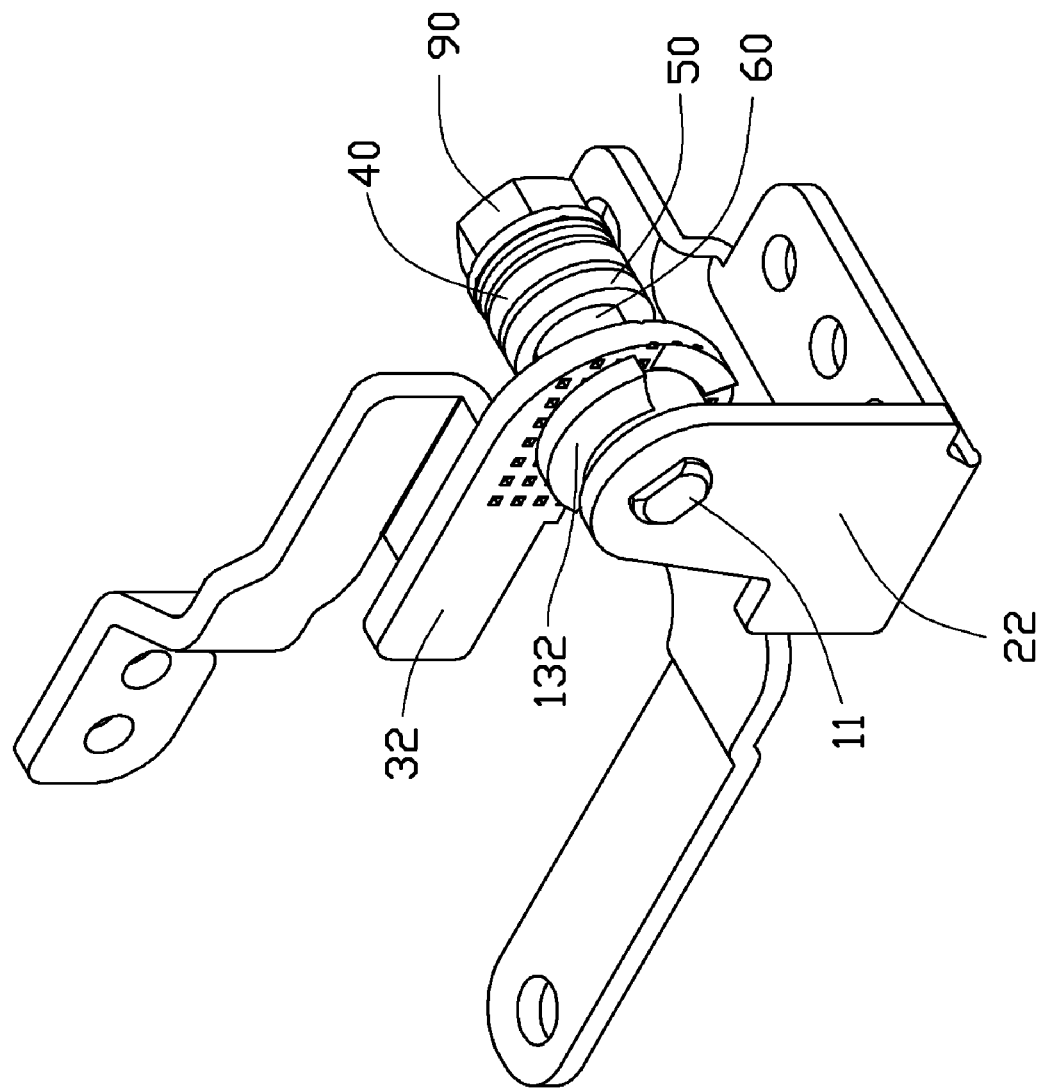
FIG. 3 is an assembled, isometric view of the hinge of FIG. 1.

Referring to FIG. 3, in assembly, the post 12 of the shaft 10 is inserted through the pivot hole 322 of the bracket 30, the sleeve member 60, the through hole 51 of the second interference member 50, the through hole 41 of the first interference member 40, the through holes of the resilient pieces of the resilient assembly 80, the through hole of the friction piece 70 in that order, to be screwed into the fastener 90. The fixed portion 11 of the shaft 10 is fixed to the mounting hole 222 of the rack 20. The sleeve member 60 is set around the column portion 122 of the shaft 10. An inner surface of the sleeve member 60 is in tight contact with the column portion 122 of the shaft 10. The engaging portion 64 of the sleeve member 60 engages in the locking slot 323 of the bracket 30. The inserting pillar 54 engages in the cutout 66 of the sleeve member 60.

In use, when one part of the collapsible device rotates with respect to the other part of the collapsible device to open or close the collapsible device, the shaft 10 rotates relative to the bracket 30. The first interference member 40 rotates with the shaft 10. The raised portions 42 of the first interference member 40 may slide into or out of the recessed portions 53 of the second interference member 50, respectively. The stopping portion 132 of the shaft 10 engages the block 331 of the bracket 30, limiting the shaft 10 relative to the bracket 30. The column portion 122 of the shaft 10 rotates in the sleeve member 60 to bias the inner surface of the sleeve member 60 and supply friction.

While several embodiments have been disclosed, it is understood that any element disclosed in any one embodiment is easily adapted to other embodiments. It is also to be understood, however, that even though numerous characteristics and advantages of the disclosure have been set forth in the foregoing description, together with details of the structure and function of the invention, the disclosure is illustrative only, and changes may be made in details, especially in matters of shape, size, and arrangement of parts within the principles of the invention to the full extent indicated by the broad general meaning of the terms in which the appended claims are expressed.

What is claimed is:

1. A hinge, comprising:
    a shaft comprising a post, the post comprising a column portion;
    a bracket defining a locking slot, and a pivot hole through which the post of the shaft rotatably extends;
    a first interference member fixed on the post of the shaft;
    a second interference member arranged around the post of the shaft, engaging and rotatable relative to the first interference member; and
    a sleeve member set around and in tight contact with the column portion of the shaft, comprising an engaging portion engaging in the locking slot to fix the sleeve member to the bracket, wherein a cutout is defined in the sleeve member and engages an inserting pillar formed on the second interference member.

2. The hinge of claim 1, wherein the first interference member comprises a raised portion facing the second interference member, and the second interference member comprises a recessed portion, into which the raised portion of the first interference member is slidably received.

3. The hinge of claim 1, wherein the cutout and the engaging portion are formed at opposite ends of the sleeve member.

4. The hinge of claim 1, wherein the sleeve member is generally C-shaped, with an opening defined in a circumference thereof along an axis.

5. The hinge of claim 1, wherein the post further comprises a compressed portion having a double-D shaped cross section, with the first interference member generally cylindrical-shaped and defining a double-D shaped through hole to snugly fit about the compressed portion of the post.

6. The hinge of claim 1, further comprising a resilient assembly rotatably retained on the shaft, impelling the first interference member and the second interference member together.

7. The hinge of claim 6, further comprising a fastener screwed on a distal end of the post of the shaft, and a friction piece arranged on the post between the resilient assembly and the fastener.

8. The hinge of claim 1, wherein the shaft comprises a head portion, from one side of which the post extends.

9. The hinge of claim 8, wherein a block extends from one side of the bracket, and smoothly transitioned to the side of the bracket, a stopping portion extends from the head portion for engaging with the block.

10. A hinge comprising:
    a shaft comprising a column portion, and a compressed portion extending from the column portion;
    a bracket defining a pivot hole, the column portion of the shaft rotatably extending through the bracket;
    a first interference member unrotatably mounted on the compressed portion of the shaft;
    a second interference member pivotably arranged around the compressed portion of the shaft, the second interference member engagable with and rotatable relative to the first interference member; and
    a sleeve member set around and in tight contact with the column portion of the shaft, a first end of the sleeve member fixed to the bracket, and a second end opposite to the first end of the sleeve member fixed to the second interference member.

11. The hinge of claim 10, wherein the first interference member comprises a raised portion facing the second interference member, and the second interference member comprises a recessed portion, into which the raised portion of the first interference member is slidably received.

12. The hinge of claim 10, wherein a cutout is defined in the second end of the sleeve member, the second interference member forms an inserting pillar engaging the cutout of the sleeve member.

13. The hinge of claim 12, wherein the bracket defines a locking slot, an engaging portion is formed at the first end of the sleeve member for engaging in the locking slot.

14. The hinge of claim 13, wherein the locking slot is in communication with the pivot hole of the bracket.

15. The hinge of claim 10, wherein the sleeve member is substantially C-shaped, and an opening is defined in a circumference of the sleeve member along an axis.

16. The hinge of claim 10, further comprising a resilient assembly rotatably retained on the shaft, impelling the first interference member and the second interference member together.

17. The hinge of claim 16, further comprising a fastener screwed on a distal end of the compressed portion of the shaft, and a friction piece arranged on the compressed portion between the resilient assembly and the fastener.

18. The hinge of claim 10, wherein the shaft further comprises a head portion, from one side of which the column portion extends.

19. The hinge of claim 18, wherein a block extends from one side of the bracket, and smoothly transitions to the side of the bracket, and a stopping portion extends from the head portion for engaging with the block.

* * * * *